(12) United States Patent
Harriman et al.

(10) Patent No.: US 8,395,416 B2
(45) Date of Patent: Mar. 12, 2013

(54) INCORPORATING AN INDEPENDENT LOGIC BLOCK IN A SYSTEM-ON-A-CHIP

(75) Inventors: David J. Harriman, Portland, OR (US); Daniel S. Froelich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 12/886,909

(22) Filed: Sep. 21, 2010

(65) Prior Publication Data

US 2012/0068735 A1    Mar. 22, 2012

(51) Int. Cl.
*H03K 19/0175* (2006.01)

(52) U.S. Cl. .............................. 326/63; 326/62; 710/105

(58) Field of Classification Search ........................ None
See application file for complete search history.

(56) References Cited

U.S. PATENT DOCUMENTS

| | | | |
|---|---|---|---|
| 5,574,849 A | 11/1996 | Sonnier et al. | |
| 5,751,955 A | 5/1998 | Sonnier et al. | |
| 6,009,488 A | 12/1999 | Kavipurapu | |
| 6,678,756 B1 | 1/2004 | Tseng et al. | |
| 6,687,255 B1 | 2/2004 | Holm et al. | |
| 6,711,227 B1 | 3/2004 | Kaylani et al. | |
| 6,711,696 B1 | 3/2004 | Bates et al. | |
| 6,760,791 B1 * | 7/2004 | Askar ............................. 710/52 |
| 7,107,393 B1 | 9/2006 | Sabih | |
| 7,296,174 B2 | 11/2007 | Kelly | |
| 7,310,396 B1 | 12/2007 | Sabih | |
| 7,353,162 B2 * | 4/2008 | Huang et al. ................... 703/23 |
| 2003/0188213 A1 | 10/2003 | Kark et al. | |
| 2006/0047975 A1 * | 3/2006 | Beukema et al. ............. 713/193 |
| 2006/0242461 A1 * | 10/2006 | Kondo et al. ................... 714/21 |
| 2007/0073977 A1 | 3/2007 | Safranek et al. | |
| 2010/0174936 A1 | 7/2010 | Hill | |
| 2010/0246594 A1 * | 9/2010 | Klinglesmith et al. ....... 370/419 |
| 2011/0145909 A1 | 6/2011 | Rachakonda | |

OTHER PUBLICATIONS

Intel Corporation, "Product Brief, Intel® EP80579 Integrated Processor, Embedded Computing; Intel® EP80579 Integrated Processor for Embedded Computing Complete System-on-a-Chip for Communications, Storage and Embedded Designs," 2009, 4 pages.

Intel Corporation, "PHY Interface for the PCI Express Architecture," 2007, pp. 1-38.

* cited by examiner

*Primary Examiner* — Crystal L Hammond
(74) *Attorney, Agent, or Firm* — Trop, Pruner & Hu, P.C.

(57) ABSTRACT

In one embodiment, the present invention includes a logic having a first link interface to enable communication with an intellectual property (IP) logic adapted on a single semiconductor die with the logic, where the IP logic includes a second link interface coupled to the first link interface via an on-die interconnect. In this way, the IP logic can be unmodified with respect to a standalone device having the IP logic incorporated therein. Other embodiments are described and claimed.

21 Claims, 7 Drawing Sheets

INCORPORATING AN INDEPENDENT LOGIC BLOCK IN A SYSTEM-ON-A-CHIP

BACKGROUND

As semiconductor technology advances, greater amounts of functionality can be incorporated on a single semiconductor die. Historically, different functionality was realized via separate integrated circuits (ICs) to provide different functions such as processing functions, control functions, interface functions and so forth. However, modern semiconductors can incorporate multiple functions such as these and more in a single integrated circuit.

One example of this trend is the increasing number of system-on-a-chip (SoC) devices that are available. These single die ICs include various circuitry such as processing circuitry, interface circuitry, specialized functional circuitry and so forth. As such, embedded devices and portable devices such as mobile terminals, cellular telephones, smart phones, netbooks and so forth can be implemented with a smaller number of devices.

Another example of this trend is the prevalence of multiprocessor systems, where the system can include one or more multi-core processors, which may be configured on a single semiconductor die or integrated on multiple die within a single package, namely a multichip module (MCM).

To provide further processing capabilities in some situations, an independent logic block, e.g., of a third party, can be incorporated into another semiconductor die or device. For example, a so-called independent intellectual property (IP) logic block can be incorporated into a processor, SoC or other semiconductor device. However, there can be significant complexities involved in incorporating a third party design into such a device. This is especially so with regard to interconnect communications between the added IP block and the rest of the semiconductor device. For example, current solutions for SoC use are not readily adaptable for use with a physical interface to an interconnect (e.g. a so-called PHY device), requiring a third party IP vendor to provide an adapter or to rewrite their logic block.

DETAILED DESCRIPTION

In various embodiments, circuitry and methods may be provided to enable third party intellectual property (IP) blocks such as peripheral controllers, adapters, etc., to be incorporated in a system-on-a-chip (SoC) or other semiconductor device such as a multi-core processor or a multi-chip module (MCM). In various embodiments, a link interface may provide for adaptation of the third party IP logic block into the semiconductor device. While the scope of the present invention is not limited in this regard, in some embodiments components of both a link interface and a physical interface for a Peripheral Component Interconnect Express™ architecture, otherwise referred to as a PIPE PHY, and which may be in accordance with the PHY Interface for the PCI Express™ Architecture specification version 2.00 (published 2007 by Intel Corp., and hereafter the "PIPE PHY specification") may be used. Such a so-called PIPE PHY may be the physical portion of an interface having Link-PHY functionality. In general, the link interface may perform various functionality with respect to link layer operations such as link training, lane deskewing, link status, control and so forth, while the physical layer performs functionality such as serialization/deserialization, coding/decoding, equalization, physical interconnect interfacing and so forth.

Embodiments incorporating a Link-PHY interface may modify the basic design of the interface to enable on-die connection without a PHY so that a third party logic block can be incorporated into a semiconductor device without modification whatsoever, as well as to enable off-die connection to a PHY. The Link-PHY interface on the device side (i.e., third party logic) may be unmodified, allowing a standalone device IP to be reused as is for SoC implementations. This minimizes time to market (TTM) and development cost, effectively reducing to zero the cost to a device vendor of providing an SoC IP block version of a standalone device. In turn, the number of devices available for SoC use effectively increases, and the cost to SoC developers can be reduced.

To that end, embodiments may provide for modifications to an upstream component having a PIPE-based Link-PHY interface to implement various capabilities/mechanisms in the host (e.g., SoC) side to enable reuse of a downstream component having an unmodified device IP logic block. While the scope of the present invention is not limited in this regard, such modifications may be to an interface protocol, e.g., to terminate unneeded signals/mechanisms, emulate PHY behaviors when needed, and provide required common signals that are conventionally sourced by the PHY. By using an existing Link-PHY interface of an unmodified standalone device, an IP block can be reused as is for SoC implementations.

Figure 1A:
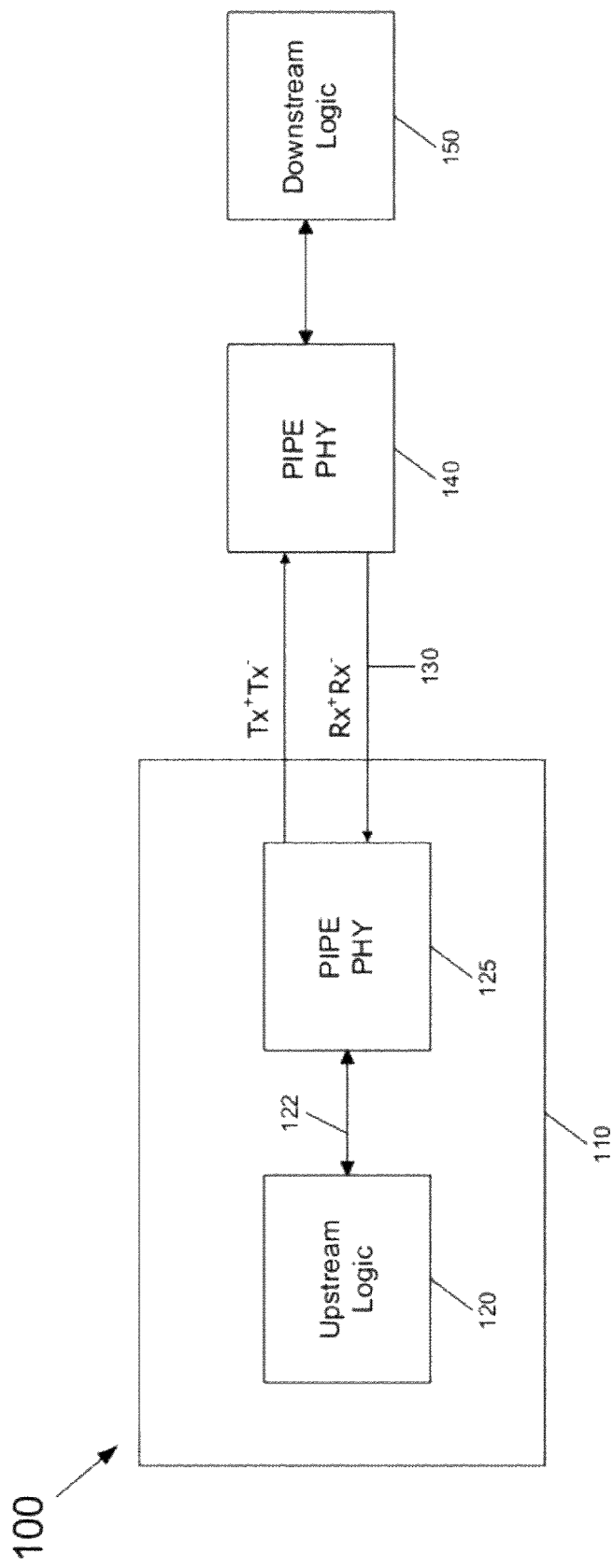
FIG. 1A is a block diagram of a portion of a system on a chip and its connection to off-chip components.

Referring now to FIG. 1A, shown is a block diagram of an example of a portion of a system on a chip and its connection to off-chip components. As seen in FIG. 1A, a system 100 may include a SoC 110 that includes upstream logic 120, which may be any of various types of circuitry, such as processing circuitry, other functional circuitry, controller circuitry and so forth, and which may further include a link portion of a Link-PHY interface. This concept of upstream and downstream may be based on usage of those terms in the PCI Express™ Specification Base Specification version 2.0 (published Jan. 17, 2007). However, understand that embodiments are not limited to a PCIe™ implementation and upstream and downstream can simply refer to direction of communication with respect to a core element of the SoC (e.g., one or more cores of the SoC, which may be coupled upstream of upstream logic 120).

Via an on-chip interconnect 122, upstream logic 120 communicates with a PIPE PHY 125. As described above, in some embodiments this PIPE PHY may be in accordance with the PIPE PHY specification. In general, a PIPE PHY operates to take incoming signals, which may be received in parallel at high speed and condition and transform the signals for output via a physical interconnect 130, that is, an off-chip interconnect. In the implementation shown, the off-chip interconnect may be a pair of unidirectional differential lines to transmit data to a corresponding PIPE PHY 140, which in some embodiments may be a standalone IC, and to receive an incoming differential signal pair from PIPE PHY 140. In turn, PIPE PHY 140 may communicate with a downstream logic 150, which again may be a separate IC including a given type of functionality, such as a peripheral controller, e.g., a disk controller, network interface card or so forth. While shown with this particular implementation in the embodiment of FIG. 1A, understand that in other implementations PIPE PHY 140 and downstream logic 150 may be configured on a single semiconductor die. Furthermore, understand that in different embodiments, much more circuitry may be present within a SoC.

As discussed above, embodiments may incorporate a modified PIPE Link-PHY interface on an upstream side such that an unmodified downstream logic block can be directly configured within a single semiconductor die and without including PHY's between them. While described herein as a technique to realize this connection on-die so as to connect two IP blocks, embodiments may be further applicable to provide such direct connection between two distinct dies, as in a multi-chip package (MCP) or discrete connection.

Figure 1B:
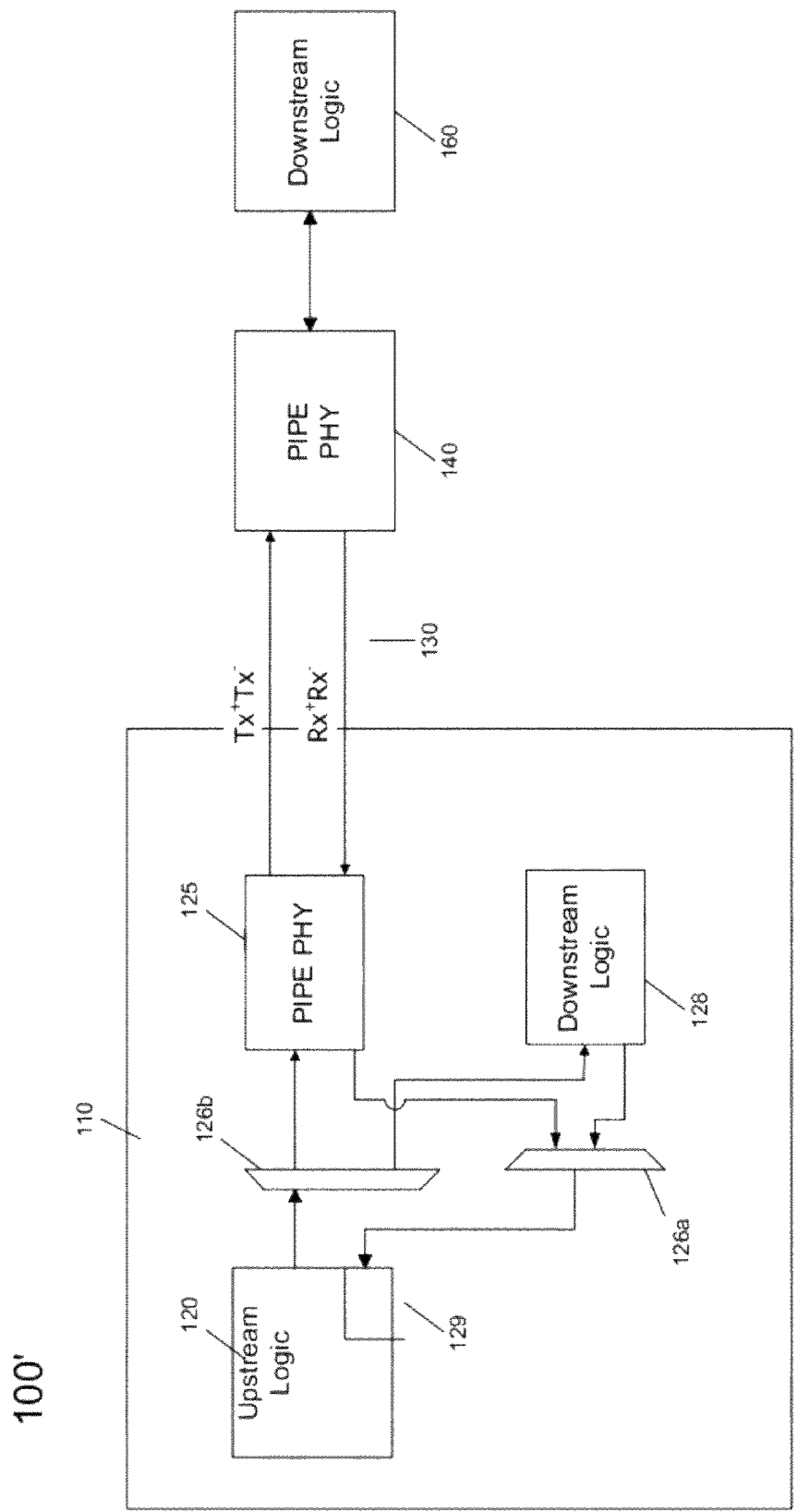
FIG. 1B is a block diagram of a system in accordance with one embodiment of the present invention.

Referring now to FIG. 1B, shown is a block diagram of a system in accordance with one embodiment of the present invention. As shown in FIG. 1B, system 100' may include a SoC 110. However, in the embodiment of FIG. 1B, a modified interface (shown as logic 129, incorporated into upstream logic 120) is provided such that via a direct on-chip connection, communication can occur between the devices without any modification to a downstream logic 128. That is, downstream logic 128 as incorporated in SoC 110 may be identical to downstream logic 150 of FIG. 1A.

With regard to logic 129, further details will be discussed below. But for ease of introduction, understand that logic 129 may incorporate conventional link functionality of a link portion of a Link-PHY interface. In addition, logic 129 may further incorporate additional functionality to provide for emulation of certain PHY functionality to enable interfacing with an unmodified link interface of downstream logic 128.

Note that as further shown in FIG. 1B, a given SoC implementation may provide for both a conventional mechanism to provide off-chip communication to a given downstream logic 160 (e.g., via PIPE PHY 140) as well as to provide for direct communication with downstream logic 128. Further note that there is no need for physical interfaces between upstream logic 120 and on-chip downstream logic 128. Understand further with regard to FIG. 1B, in a given system with an integrated downstream logic 128, the attached off-chip downstream logic 160 is a different instance than downstream logic 128, and in some embodiments may provide different functionality than that of downstream logic 128. And further in a given implementation, PIPE PHY 140 and logic 160 may not be present.

Still referring to FIG. 1B, note the presence of a pair of multiplexers 126a and 126b, which may be controlled based on a given system configuration to enable communication between upstream logic 120, PIPE PHY 125 and/or downstream logic 128. For example, assume a system in which downstream logic 128 and downstream logic 160 are wholly different circuitry. In such implementation, when communication is desired between logic within SoC 110 and downstream logic 128, the communication may be via modified interface 129 within upstream logic 120. If instead the communication from the component within SoC 110 is to be destined to off-chip downstream logic 160, the communication may be through upstream logic 120 (namely through the same modified interface) and multiplexer 126, PIPE PHY's 125 and 140, and finally to downstream logic 160. While shown with this high-level view in the embodiment of FIG. 1B, understand the scope of the present invention is not limited in this regard and in various embodiments, much additional circuitry may be present within SoC 110. For example, in other embodiments, downstream logic 128 may be directly coupled via another on-chip interconnect to PHY 125 to enable communications off-chip. In still further embodiments, downstream logic 128 may include or be associated with a separate PHY to enable direct communications between this downstream logic and another off-chip component to which the SoC may be coupled via another off-chip interconnect.

Figure 2:
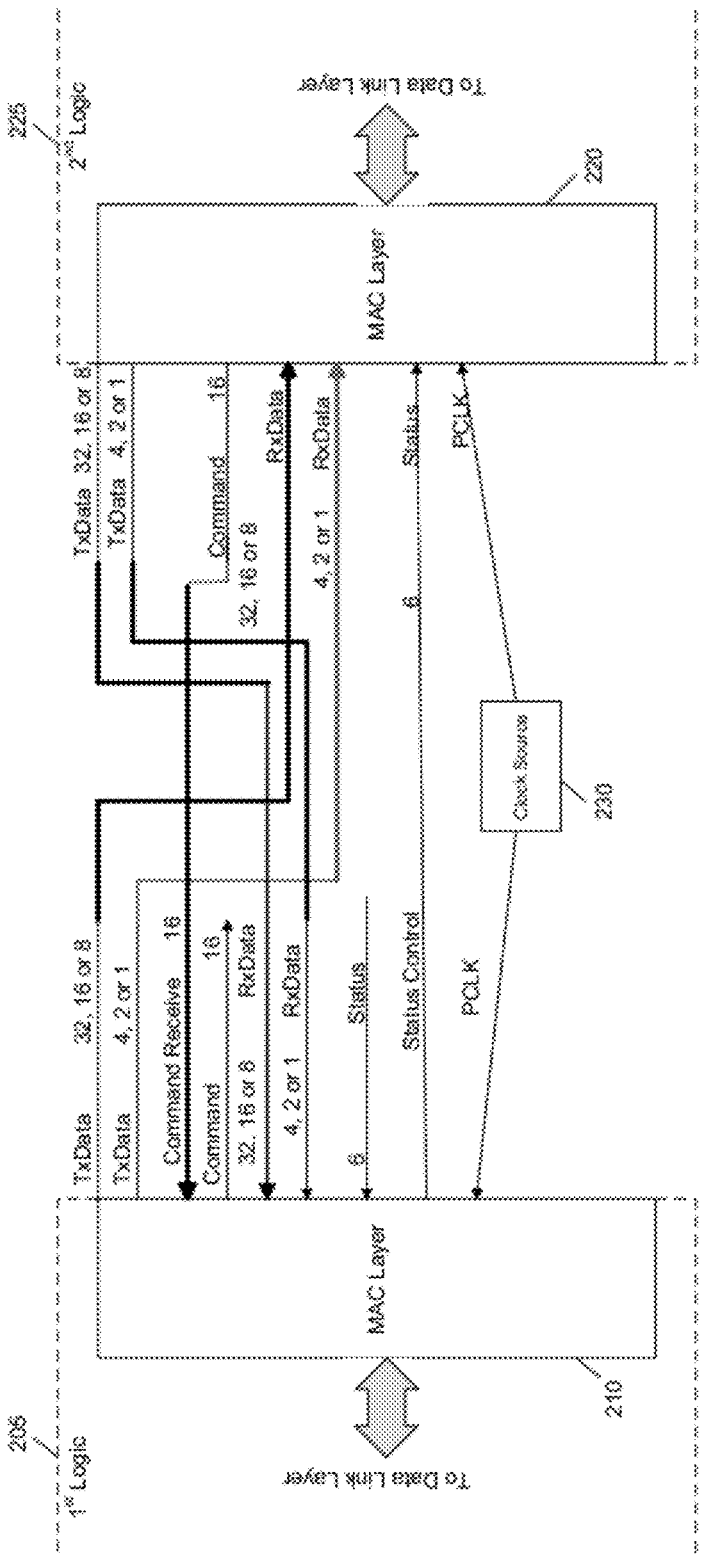
FIG. 2 is a block diagram of a direct connection between a first logic and a second logic of a semiconductor die in accordance with an embodiment of the present invention.

Referring now to FIG. 2, shown is a block diagram of a direct connection between a first logic and a second logic of a semiconductor die, where the second logic is of a third party IP design that is to be incorporated into the die. That is, the first logic may be of a silicon manufacturer's own design, while the second logic may be of a third party. In most such implementations, the first logic may be considered to be an upstream logic and the second logic considered a downstream logic. To enable incorporation of the second logic within the semiconductor die without any modification whatsoever to a standalone design for this logic, modifications to the interface in the upstream logic may be made, as discussed above.

As seen in FIG. 2, the two logics may be coupled via a media access control (MAC) layer of the corresponding logics. Note that this MAC layer corresponds to a link interface of a Link-PHY interface. Specifically, a first or upstream logic 205 may include a MAC layer 210, while in turn a second or downstream logic 225 may include a MAC layer 220. Because there is to be no modification to downstream logic 225, MAC layer 220 may be a conventional MAC layer as designed for this independent IP logic block. In contrast, MAC layer 210 may be modified from a conventional design. As seen, both such MAC layers may interface to a data link layer of the corresponding logic via internal interconnects.

Still referring to FIG. 2, various on-chip links or interconnects couple directly between the two logics. While described as being direct, understand that in various embodiments such as shown in FIG. 1B, this communication may be via a selection mechanism such as a multiplexer. However, no processing, etc., occurs to the signals that are communicated between these two logics. As further shown in FIG. 2, a clock source 230 may provide a clock signal to both logics. In one embodiment a globally available clock can be shared by the two connected link layers (note that conventionally a PHY supplies this clock to the link layer, e.g., the MAC circuitry shown in FIG. 2). In addition, a common, global, reset signal (not shown in FIG. 2) may be provided to the upstream and downstream logics which may be received from reset control logic which may be present on the SoC or external thereto.

With specific reference to the signaling shown, transmit and receive data which can be of various widths (and data/command indicators), may be coupled between the two devices. Namely, the transmit data from logic 205 may be cross-coupled to the receive data portion of MAC logic 220 and vice versa. Similarly with regard to command information, MAC logic 220 may provide command signals to command receive ports of MAC layer 210, which are extended ports to receive such command information and enable MAC layer 210 to operate accordingly based on these signals, which normally would be provided to a PHY device. However note that command signals from MAC logic 210 that would normally couple to a PHY and status signals that would normally be input into MAC logic 210 from a PHY are terminated, such that MAC logic 220 remains unmodified. In addition, MAC layer 210 further provides certain status and control signals so that MAC layer 220 can operate in its unmodified state in response to such signaling. Note that the command and status busses include a number of distinct signals, some of which are described in detail below.

Tables 1-5 below provide a basic description of the types of signaling present as shown in FIG. 2. More specifically, the tables below provide a description of signaling present in a Link-PHY interface, both with respect to signals for a MAC layer and a PHY layer. Although FIG. 2 does not show a PHY layer for ease of illustration, understand that in various embodiments, PHY devices can be present in a system such as shown in FIGS. 1A and 1B. With respect to the tables, note that Input/Output may be defined from the perspective of the PHY layer. An "Output" is driven by the PHY layer (or a modified link interface in accordance with an embodiment of the present invention) and a signal described as an "Input" is received by the PHY layer (or a modified link interface in accordance with an embodiment of the present invention). In various embodiments, all signals on the 'parallel' or MAC side may be synchronous with PCLK, with exceptions noted below. Further details regarding the signals can be found in the PIPE PHY specification discussed above, from which these tables are adapted.

TABLE 1

Transmit Data Interface Signals

| Name | Direction | Active Level | Description |
|---|---|---|---|
| Tx+, Tx− | Output | N/A | The PCI Express differential outputs from the PHY. All transmitters shall be AC coupled to the media. See section 4.3.1.2 of the PCI Express Base Specification. |
| TxData[15:0] for 16-bit interface TxData[7:0] for 8-bit interface | Output | N/A | Parallel PCI Express data input bus. For the 16 bit interface, 16 bits represents 2 symbols of transmit data. Bits [7:0] are the first symbol to be transmitted, and bits [15:8] are the second symbol. |
| TxDataK[1:0] for 16-bit interface TxDataK for 8-bit interface | Output | N/A | Data/Control for the symbols of transmit data. For 16-bit interfaces, Bit 0 corresponds to the low-byte of TxData, Bit 1 to the upper byte. A value of zero indicates a data byte, a value of 1 indicates a control byte. |

TABLE 2

Receive Data Interface Signals

| Name | Direction | Active Level | Description |
|---|---|---|---|
| Rx+, Rx− | Input | N/A | The PCI Express differential inputs to the PHY. |
| RxData[15:0] for 16-bit interface or RxData[7:0] for 8-bit interface | Input | N/A | Parallel PCI Express data output bus. For 16-bit interface, 16 bits represents 2 symbols of receive data. Bits [7:0] are the first symbol received, and bits [15:8] are the second symbol. |
| RxDataK[1:0] for 16-bit interface RxDataK for 8-bit interface | Input | N/A | Data/Control bit for the symbols of receive data. For 16-bit interface, Bit 0 corresponds to the low-byte of RxData[15:0], Bit 1 to the upper byte. A value of zero indicates a data byte; a value of 1 indicates a control byte. |

TABLE 3

Command Interface Signals

| Name | Direction | Active Level | Description |
|---|---|---|---|
| TxDetectRx/ Loopback | Output | High | Used to tell the PHY (or a MAC in accordance with an embodiment of the present invention to begin a receiver detection operation or to begin loopback. |
| TxElecIdle | Output | High | Forces Tx output to electrical idle when asserted in all power states. When deasserted while in P0 (as indicated by the PowerDown signals), indicates that there is valid data present on the TxData[..] and TxDataK[..]pins and that the data must be transmitted. When deasserted in P2 (as indicated by the PowerDown signals), indicates that the PHY should begin transmitting beacon signaling. In this case, the signal is asynchronous. TxElecIdle must always be asserted while in power states P0s and P1 (as indicated by the PowerDown signals). |
| TxCompliance | Output | High | Sets the running disparity to negative. Used when transmitting the compliance pattern. |
| RxPolarity | Output | High | Tells PHY to do a polarity inversion on the received data. 0  PHY does no polarity inversion. 1  PHY does polarity inversion. |

TABLE 3-continued

Command Interface Signals

| Name | Direction | Active Level | Description |
|---|---|---|---|
| Reset# | Output | Low | Resets the transmitter and receiver. This signal is asynchronous. |
| PowerDown[1:0] | Output | N/A | Power up or down the transceiver. Power states<br>[1] [0] Description<br>0   0   P0, normal operation<br>0   1   P0s, low recovery time latency, power saving state<br>1   0   P1, longer recovery time (64 us max) latency, lower power state<br>1   1   P2, lowest power state.<br>When transitioning from P2 to P1, the signaling is asynchronous (since PCLK is not running). |
| Rate | Output | N/A | Control the link signaling rate.<br>0   Use 2.5 GT/s signaling rate<br>1   Use 5.0 GT/s signaling rate<br>PIPE implementations that only support 2.5 GT/s signaling rate do not implement this signal. |
| TxDeemph | Output | N/A | Selects transmitter de-emphasis.<br>0   −6 dB de-emphasis at 5 GT/s<br>1   −3.5 dB de-emphasis at 5 GT/s<br>PIPE implementations that only support 2.5 GT/s signaling rate do not implement this signal. |
| TxMargin[2:0] | Output | N/A | Selects transmitter voltage levels.<br>[2] [1] [0] Description<br>0   0   0   TxMargin value 0 = Normal operating range<br>0   0   1   TxMargin value 1 = 800 1200 mV for Full swing* OR 400-700 mV for Half swing*<br>0   1   0   TxMargin value 2 = required and vendor defined<br>0   1   1   TxMargin value 3 = required and vendor defined<br>1   0   0   TxMargin value 4 = required and 200-400 mV for Full swing* OR 100-200 mV for Half swing* if the last value or vendor defined<br>1   0   1   TxMargin value 5 = optional and 200-400 mV for Full swing* OR 100-200 mV for Half swing* if the last value OR vendor defined OR Reserved if no other values supported<br>1   1   0   TxMargin value 6 = optional and 200-400 mV for Full swing* OR 100-200 mV for Half swing* if the last value OR vendor defined OR Reserved if no other values supported<br>1   1   1   TxMargin value 7 = optional and 200-400 mV for Full swing* OR 100-200 mV for Half swing* if the last value OR Reserved if no other values supported<br>PIPE2 implementations that only support 2.5 GT/s signaling rate do not implement this signal. |
| TxSwing | Output | N/A | Controls transmitter voltage swing level<br>0 - Full swing<br>1 - Low swing<br>Implementation of this signal is optional |

TABLE 4

Status Interface Signals

| Name | Direction | Active Level | Description |
|---|---|---|---|
| RxValid | Input | High | Indicates symbol lock and valid data on RxData and RxDataK. |
| PhyStatus | Input | High | Used to communicate completion of several PHY functions (or emulated PHY) including power management state transitions, rate change, and receiver detection. When this signal transitions during entry and exit from P2 and PCLK is not running, then the signaling is asynchronous. In error situations (where the PHY or MAC in accordance with an embodiment of the present invention fails to assert PhyStatus) the MAC can take MAC-specific error recovery actions. |
| RxElecIdle | Input | High | Indicates receiver detection of an electrical idle. While deasserted with the PHY in P2, indicates detection of beacon. This is an asynchronous signal. |
| RxStatus[2:0] | Input | N/A | Encodes receiver status and error codes for the received data stream when receiving data.<br>[2] [1] [0] Description<br>0   0   0   Received data OK<br>0   0   1   1 SKP added<br>0   1   0   1 SKP removed<br>0   1   1   Receiver detected<br>1   0   0   Both 8 B/10 B decode error and (optionally) Receive Disparity error<br>1   0   1   Elastic Buffer overflow<br>1   1   0   Elastic Buffer underflow<br>1   1   1   Receive disparity error (Reserved if Receive Disparity error is reported with code 0b100) |

TABLE 5

External Signals

| Name | Direction | Active Level | Description |
|---|---|---|---|
| CLK | Input | Edge | This Input is used to generate the bit-rate clock for the PHY transmitter and receiver. Specs for this clock signal (frequency, jitter, . . . ) are implementation dependent and must be specified for each implementation. This clock may have a spread spectrum modulation. |
| PCLK | Output | Rising Edge | Parallel interface data clock. All data movement across the parallel interface is synchronized to this clock. This clock operates at 125 MHz, 250 MHz, or 500 MHz depending on the Rate control input and the data interface width. The rising edge of the clock is the reference for all signals. Spread spectrum modulation on this clock is allowed. |

Figure 3:
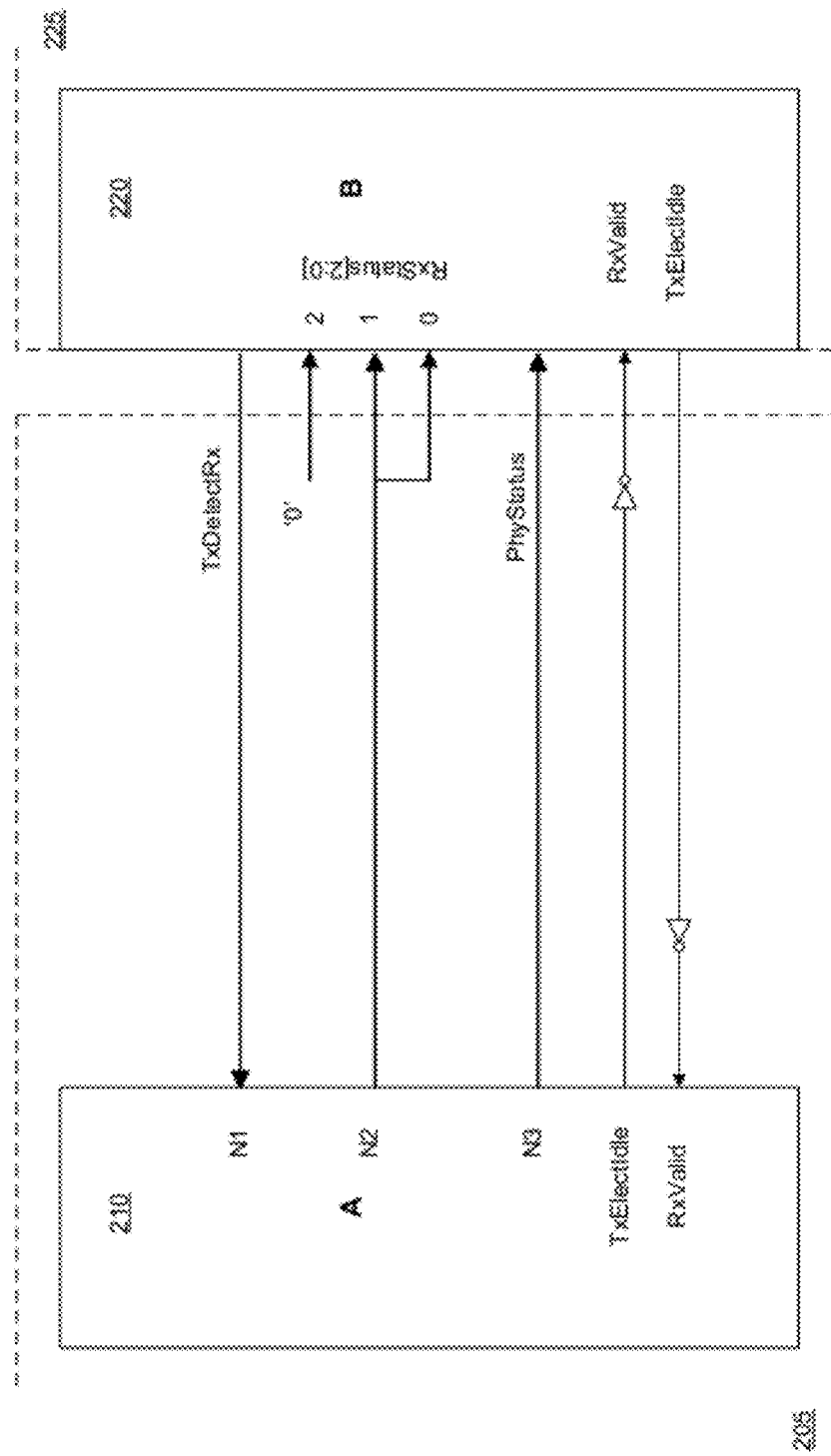
FIG. 3 is a block diagram showing signaling between on-chip logics in accordance with an embodiment of the present invention.

Referring now to FIG. 3, shown is a close-up of a portion of the signaling between on-chip logics in accordance with an embodiment of the present invention. As shown in FIG. 3, logic 205 and namely a MAC layer 210 includes a first node N1 is coupled to receive a transmit receiver detection signal (txdetectrx). This new signal input on upstream side may be used to emulate a PHY function for certain link training state machine state transitions. In addition, MAC layer 210 further includes two nodes, N2 and N3, configured to provide status signals to MAC layer 220. More specifically, node N3 provides a PHY status signal (PHY Status), while node N2 is to provide a single output to generate a receiver status signal (Rx Status) for input to MAC layer 220. As seen, this single output from node N2 may be coupled to two input nodes of MAC logic 220. In turn, a least significant bit of the receiver status signal may be fixed at a logical low level, as shown in FIG. 3, e.g., via a ground connection. Thus modifications are provided to logic within the upstream component 205, while the MAC layer of the downstream component 220 remains unmodified.

Note that these signals transmitted from upstream MAC layer 205 may be used to implement a receiver detect protocol between upstream logic 210 and downstream logic 225. More specifically, MAC layer 205 may control the RxStatus[2:0] inputs to the downstream logic side to distinguish between codes RxDataOK (000b) and RxDetected (011b), which can be done using a single output on node N2 from upstream MAC layer 205, as shown in FIG. 3, as an optimization. Note that in various implementations, other RxStatus codes (as shown in Table 4) may not be needed for the Link-Link interface shown in FIG. 2. In other embodiments however, all such status signals may be provided.

If downstream logic drives the signal TxElectIdle, the upstream logic may respond with an appropriate handshake on the PhyStatus line to complete a virtual transition to electrical idle. This can occur, for example, when the unmodified downstream logic block transitions its transmitter to a low power state such as a link low power state (e.g., L0s).

As further shown in FIG. 3, in some embodiments, the RxValid input to upstream MAC logic 205 can be connected to a logically inverted version of the TxElectIdle output from downstream MAC logic 220. Similarly, the RxValid input to downstream MAC logic 220 can be connected to a logically inverted version of the TxElectIdle output from upstream MAC logic 205.

In some embodiments, the Link-Link interface shown in FIG. 2, which is for a single lane, may support multiple data path widths on the RxData, RxDataK, TxData and TxDataK signals. To support changing link bandwidth, the DataBusWidth[1:0] signals may used.

Note that certain signals set forth in the PIPE PHY specification and shown in the above Tables for a Link-PHY interface may not be needed for purposes of the Link-Link interface shown in FIG. 2. In some implementations, these signals may be left unconnected in a Link-Link interconnect model. In one embodiment, signals that can be left unconnected may include: TxCompliance, TxMargin[ ], TxDeemph[ ], TxSwing, RxPolarity, Phy_Mode[ ], TxOnesZeros, PowerDown[1:0], Rate and RxPolarity. Of course in other embodiments, some of these signals may be connected and additional signals can be unconnected. Still further, understand that in an implementation such as shown in FIG. 1B with the ability for multiplexing such that both a Link-Link interface and a Link-PHY interface are possible, all of these signals may be connected appropriately for purposes of the Link-PHY interface.

Finally, with reference back to FIG. 2 understand that the implementation shown is for a single lane link. That is, while parallel connections of multiple signals are shown in the FIG. 2 Link-Link interface, understand that the corresponding off-chip interface to which the downstream component may connect is of a single lane where a PHY is used, namely a single differential pair in the transmit direction and a single differential pair in the receive direction. However, to provide for multi-lane inter-chip communication using an internal Link-Link interface as discussed above regarding FIG. 2, multiple Link-Link interfaces such as that of FIG. 2 may be configured, each corresponding to one lane of the off-chip interconnect.

Figure 4:
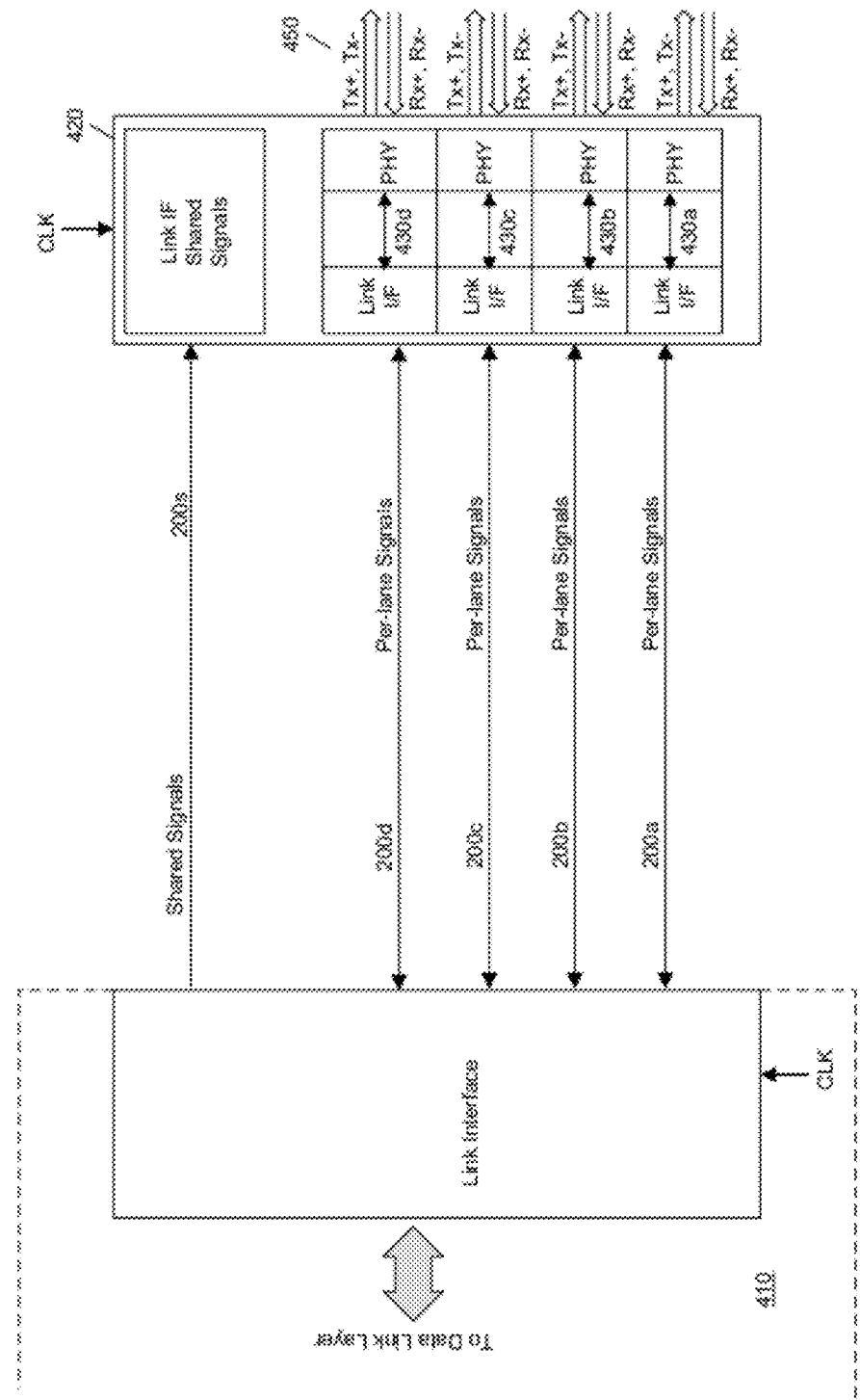
FIG. 4 is a block diagram of a plurality of Link-Link interfaces in accordance with an embodiment of the present invention.

Referring now to FIG. 4, shown is a block diagram of a plurality of Link-Link interfaces that can provide for such functionality. As seen in FIG. 4, multiple Link-Link interfaces 200a-d may be provided between a first on-chip logic 410 and a second on-chip logic 420. Each of these Link-Link interfaces may be configured as shown in FIG. 2. Furthermore, as discussed below, in some embodiments, an additional Link-Link interface 200s may be used for connection of shared signals. As further shown FIG. 4, on-chip logic 420 may couple via conventional link-PHY interfaces 430a-d to a plurality of lanes of an off-chip interconnect 450.

As further shown in the embodiment of FIG. 4, in a multi-lane implementation a reduced set of signaling can be realized for communication between the MAC layers of the two logics. That is, certain signals for each Link-Link interface may be provided for the data as well as certain status and command signals, namely TxData[ ], TxDataK[ ], RxData[ ], RxDataK[ ], TxElecIdle, TxCompliance, RxPolarity, RxValid, RxElecIdle, and RxStatus[2:0] (although at least some of these may not be needed at all for a Link-Link interface), may be provided on a per-Link-Link interface basis. However, to reduce slightly overhead in space and complexity, other signals, such as clock signals and additional control and status signals may be shared across the different Link-Link interfaces. Specifically, in one embodiment the following signals may be shared across the links: CLK, PCLK, TxDetectRx/Loopback, Reset#, PowerDown[1:0], PhyStatus, Rate, TxMargin[2:0], TxDeemph, and TxSwingblank (although again not all of these signals may be needed for a Link-Link interface).

Figure 5:
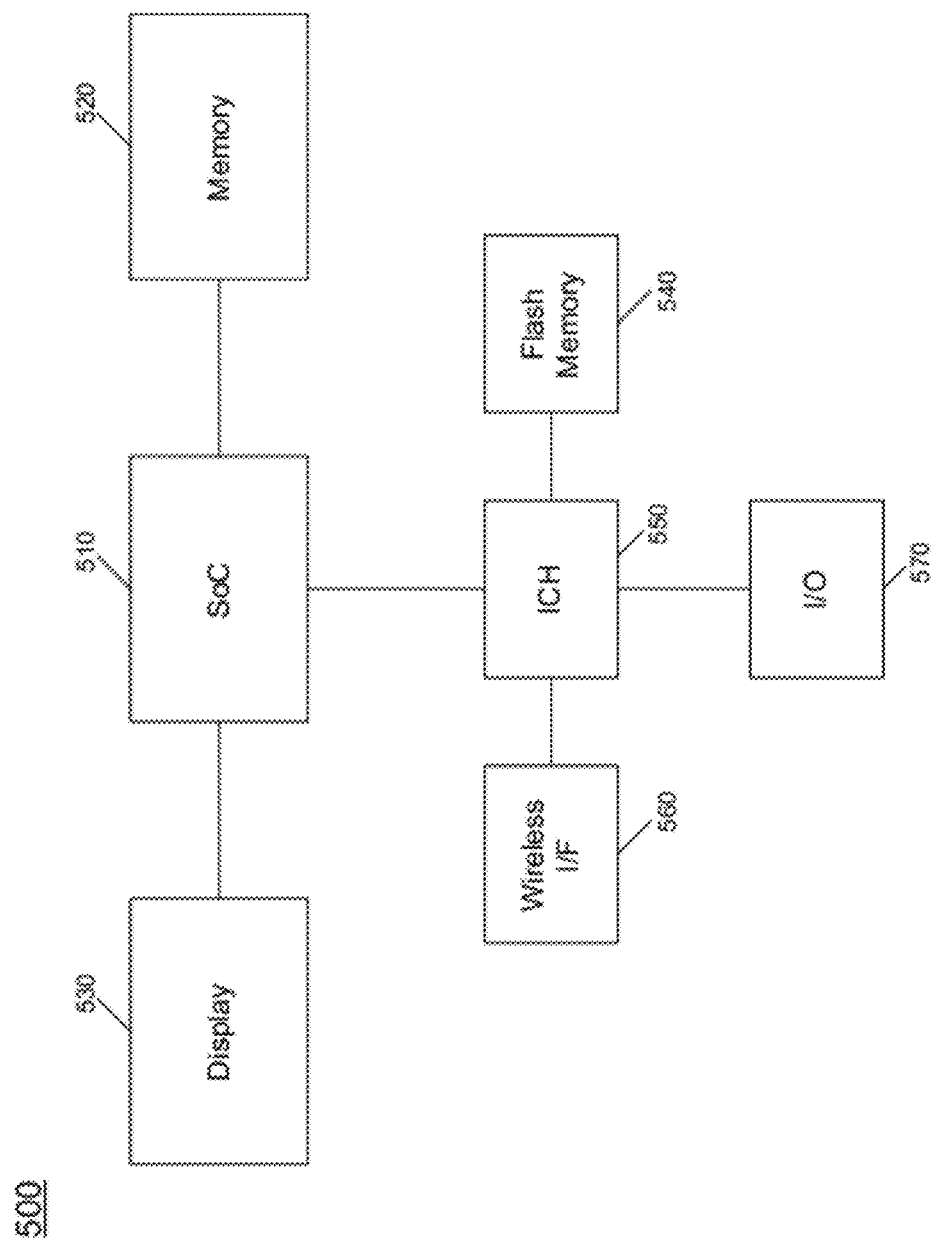
FIG. 5 is a block diagram of a system in accordance with one embodiment of the present invention.

Note that an SoC in accordance with an embodiment of the present invention may be of various types of designs including multi-core and many-core processor designs with additional agents such as cores, caches, accelerators, memory controllers and so forth. SoCs can be used in many different systems. As one particular example, a SoC in accordance with an embodiment of the present invention can be incorporated into a computer system such as a netbook computer. Referring now to FIG. 5, shown is a block diagram of a system in accordance with one embodiment of the present invention. As shown in FIG. 5, system 500 may be a netbook or other small form factor computer.

As seen, SoC 510 may be a SoC in accordance with an embodiment of the present invention such as described above regarding FIG. 1B. A memory 520, which in one embodiment may be dynamic random access memory (DRAM), may be coupled to SoC 510, as the SoC may include an integrated memory controller. In addition, SoC 510 may be coupled to a display 530 such as a liquid crystal display (LCD) or other such display, as the SoC may further include graphics functionality. In addition, SoC 510 may couple to an input/output controller hub (ICH) 550 that in turn may couple to various system components such as a flash memory 540 which in one embodiment may act as a mass storage system for the system, as its small form factor may be appropriate for a netbook or other small device. In addition, ICH 550 may couple to a wireless interface 560 that may enable communication, e.g., via a local area network (LAN) such as a Bluetooth™ connection, a wireless LAN (WLAN) in accordance with Institute of Electrical and Electronics Engineers (IEEE) 802.11 or another such standard. In addition, wireless interface 560 may further enable communication via a wide area network such as a cellular communication network. ICH 550 may further couple to one or more IO devices 570 such as a keyboard, mouse, pointer or other user interface device. While shown with this particular implementation in the embodiment of FIG. 5, the scope of the present invention is not limited in this regard.

Figure 6:
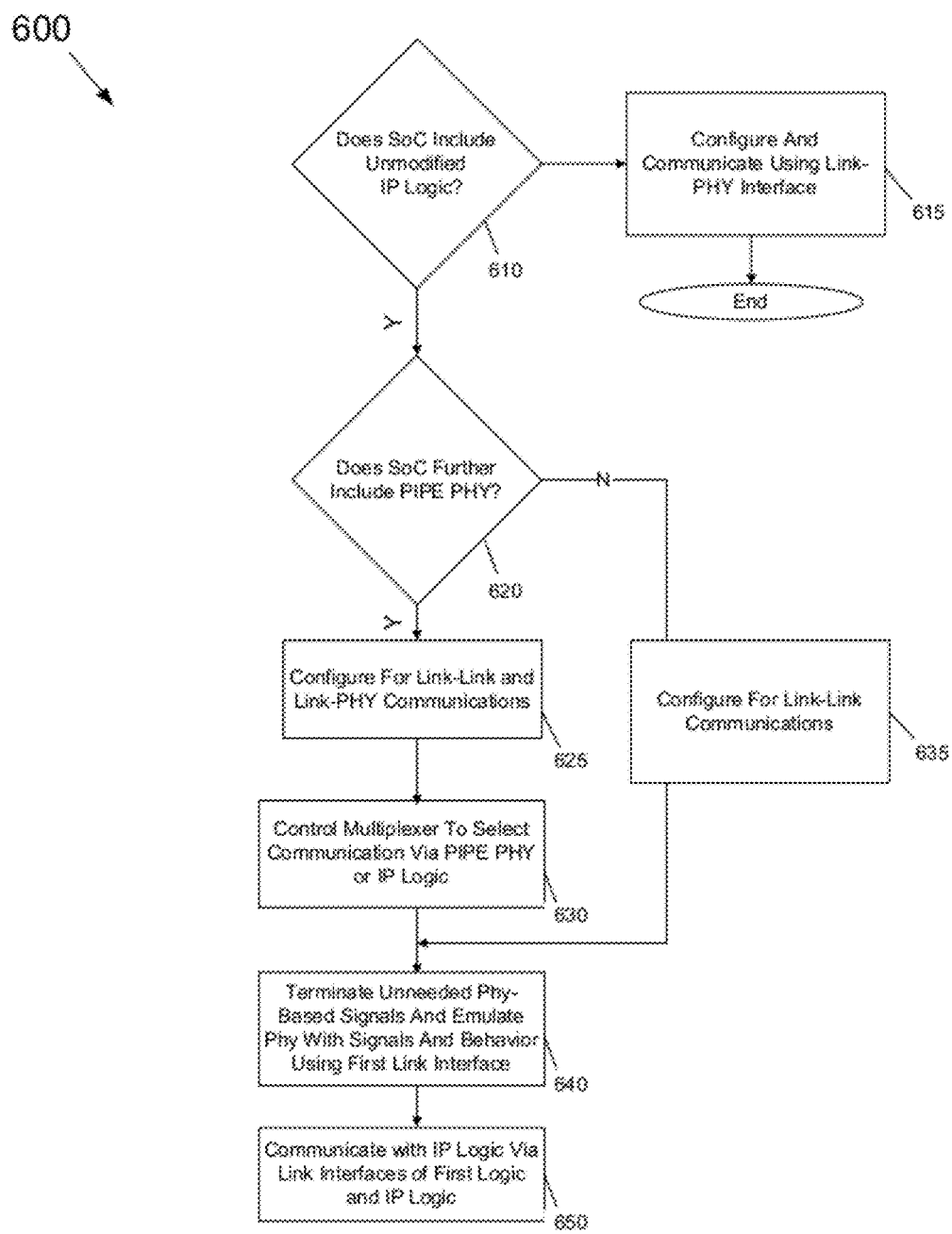
FIG. 6 is a flow diagram of a method in accordance with one embodiment of the present invention.

Referring now to FIG. 6, shown is a flow diagram of a method in accordance with one embodiment of the present invention. As shown in FIG. 6, method 600 may be used both to initially configure an SoC, as well as to perform communications within the SoC during normal operations.

Method 600 may begin by determining whether the SoC includes an unmodified IP logic block (diamond 610). That is, where an IP block is incorporated that is unmodified from a standalone version, this determination may be in the positive. Accordingly, the SoC may be configured to provide for Link-Link interface communications as discussed above. If not, conventional SoC configuration and communication operations may be performed (block 615), and method 600 concludes. If the determination at diamond 610 is in the positive, control passes to diamond 620, where it may be determined whether the SoC further includes a PIPE PHY. For example, it may be determined whether or not the SoC is in a form such as that shown and described with regard to FIG. 1B. If so, control passes to block 625 where the SoC may be configured for both Link-Link and Link-PHY-based communications. If not, control passes to block 635, where the SoC may be configured for Link-Link based communications only. In both situations, configuration operations thus may be concluded such that communications during normal operation can occur.

At block 630, when a PIPE PHY is present, a selection may occur for a given communication to determine whether the communication path from the first logic is to the PHY or to the IP logic. Such determination may be based on control of a multiplexer, which may receive a control signal based on a desired destination of the communication. Then at block 640, in the presence of a Link-Link interface, various operations may be performed by the modified link interface of the first logic. Specifically, unneeded PHY-based signals may be terminated such that they are not provided to any other system component, and certain PHY functionality may be emulated using signals and behavior via the modified link interface (block 640). Then communication with the IP logic may occur via a Link-Link interface between the first logic and the IP logic (block 650). While shown with this particular implementation in the embodiment of FIG. 6, understand that the scope of the present invention is not limited in this regard.

Existing SoC interconnects vary significantly in their details, and require specific validation/test fixtures (bus functional models (BFMs) and such) to be developed. By reusing exactly existing protocols running over a defined interface, existing validation/test fixtures can be reused, further reducing costs and improving TTM significantly. As such, embodiments may be used to support both standalone device use with a PHY and also allow for inclusion within a SoC or other semiconductor die as a third party logic block. In contrast, many IP block interfaces would require such a block to be significantly modified or completely rewritten before being incorporated into die design.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an upstream logic having a first link interface to enable communication with an intellectual property (IP) logic adapted on a single semiconductor die with the upstream logic, the IP logic including a second link interface coupled to the first link interface via an on-die interconnect, where the IP logic is a downstream component with respect to the upstream logic and unmodified with respect to a standalone device having the IP logic incorporated therein.

2. The apparatus of claim 1, wherein the first link interface is modified from a specification design of a link interface for incorporation in a link-physical interface model.

3. The apparatus of claim 2, wherein the first link interface includes a first logic portion to perform at least part of functionality of a Physical Interface for Peripheral Component Interconnect Express™ Architecture (PIPE) specification.

4. The apparatus of claim 2, wherein the first link interface is to output a single signal to emulate receiver status functionality of a physical interface, wherein the single signal is coupled to a plurality of receiver status ports of the second link interface.

5. The apparatus of claim 2, further comprising an inverter to invert a transmit electrical idle signal received from the second link interface, wherein the inverted transmit electrical idle signal is coupled to a receiver valid status signal input of the first link interface to enable physical interface functionality.

6. The apparatus of claim 2, further comprising a plurality of first link interfaces and a plurality of second link interfaces, wherein the IP logic is to couple to an off-chip interconnect having a plurality of lanes.

7. The apparatus of claim 2, wherein transmit data from the first link interface is cross-coupled to receive ports of the second link interface, transmit data from the second link interface is cross-coupled to receive ports of the first link interface, transmit control data from the first link interface is cross-coupled to control receive ports of the second link interface, and transmit control data from the second link interface is cross-coupled to control receive ports of the first link interface.

8. The apparatus of claim 1, further comprising a multiplexer coupled to the upstream logic to receive an output from the upstream logic and to provide the output to the IP logic or to a physical interface coupled to the multiplexer.

9. The apparatus of claim 8, wherein the physical interface is coupled to an off-chip link.

10. The apparatus of claim 1, further comprising a clock to supply a common clock signal to the first link interface and the second link interface, the clock unassociated with a physical interface of the apparatus.

11. The apparatus of claim 1, wherein the first link interface is to provide a physical status signal to the second link interface to indicate a virtual transition to an electrical idle state responsive to a low power state entry by the IP logic.

12. A system on a chip (SoC) comprising:
a first logic having a first link interface modified from a link interface of a Physical Interface for Peripheral Component Interconnect Express™ Architecture (PIPE) specification to emulate functionality of a portion of a physical (PHY) interface of the PIPE specification;
a second logic coupled to the first logic via an on-die interconnect, the second logic having a second link interface to communicate with the first link interface, wherein the second logic is unmodified with respect to a standalone device having the second logic incorporated therein;
a PHY interface to enable communication with a component coupled to the SoC by an off-chip interconnect; and
a multiplexer coupled between the first logic, the second logic, and the PHY interface, wherein the multiplexer is controlled to provide a communication from the first link interface to a selected one of the PHY interface and the second link interface.

13. The SoC of claim 12, wherein the first link interface is to further handle signals communicated from the PHY interface according to the PIPE specification.

14. The SoC of claim 12, further comprising a plurality of first link interfaces and a plurality of second link interfaces to enable communication from the second logic to an other component coupled to the SoC via a second off-chip interconnect having a plurality of lanes.

15. The SoC of claim 12, wherein the second link interface of the second logic is further coupled to the PHY interface via a second on-die interconnect.

16. The SoC of claim 12, wherein the first link interface is to emulate a PHY interface functionality responsive to receipt of an electrical idle signal received from the second link interface.

17. The SoC of claim 12, wherein the first link interface is to receive a transmit detection receive signal from the second link interface, and the first link interface is to output a single signal to indicate one of multiple receive status signals to the second link interface.

18. A method comprising:
configuring a system-on-a-chip (SoC) including:
a first logic having a first link interface modified from a link interface of a Physical Interface for Peripheral Component Interconnect Express™ Architecture (PIPE) specification to emulate functionality of a portion of a physical (PHY) interface of the PIPE specification to enable communication via a link-link interface and a link-PHY interface; and
a second logic coupled to the first logic via an on-die interconnect, the second logic having a second link interface to communicate with the first link interface, wherein the second logic is unmodified with respect to a standalone device having the second logic incorporated therein;
determining if a communication from the first logic is destined to the second logic or to a third logic coupled to the SoC via an off-chip interconnect; and
providing the communication from the first link interface to the PHY interface if the communication is destined to the third logic and providing the communication from the first link interface to the second link interface if the communication is destined to the second logic.

19. The method of claim 18, further comprising emulating a PHY function in the first link interface when the communication is destined to the second logic.

20. The method of claim 18, further comprising receiving status signals from the second logic in the first link interface and handling the status signals in the first link interface to emulate at least one PHY function.

21. The method of claim 18, further comprising terminating at least one signal from the second link interface such that the at least one signal is not provided to any component of the SoC.

* * * * *